(12) United States Patent
Guerrero, Jr. et al.

(10) Patent No.: US 6,721,150 B1
(45) Date of Patent: Apr. 13, 2004

(54) CLAMPING CIRCUIT FOR USE IN COMPUTER SYSTEM

(75) Inventors: Edward C. Guerrero, Jr., Austin, TX (US); Barry Kent Kates, Austin, TX (US); Christopher Eric Tressler, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 189 days.

(21) Appl. No.: 09/736,846

(22) Filed: Dec. 12, 2000

(51) Int. Cl.[7] .................................................. H02H 7/00
(52) U.S. Cl. ............................................ 361/18; 361/18
(58) Field of Search .............................. 361/18, 84, 56, 361/86

(56) References Cited

U.S. PATENT DOCUMENTS

| | | | |
|---|---|---|---|
| 5,629,608 A | * 5/1997 | Budelman | 361/104 |
| 5,834,958 A | * 11/1998 | Taylor et al. | 323/222 |
| 5,870,573 A | * 2/1999 | Johnson | 710/107 |
| 5,920,511 A | * 7/1999 | Lee et al. | 365/189.05 |

OTHER PUBLICATIONS

"SC431 Adjustable Shunt Regulator Data Sheet," Semtech Corp., 1998, 6 pages.
"2N4403/MMBT4403 PNP General Purpose Amplifier Data Sheet," Fairchild Semiconductor, 1997, 2 pages.

* cited by examiner

*Primary Examiner*—Stephen W. Jackson
*Assistant Examiner*—Danny Nguyen
(74) *Attorney, Agent, or Firm*—Robert C. Kowert; Meyertons, Hood, Kivlin, Kowert & Goetzel, P.C.

(57) ABSTRACT

A clamping circuit and method for use in a computer system are provided. In the computer system, a voltage regulator supplies a voltage rail to various components in the system. This voltage rail may be susceptible to voltage spikes or other over-voltage conditions, such as when the voltage rail provides the input voltage to a switching regulator. The clamping circuit comprises a detecting stage and a clamping stage. The detecting stage detects when the voltage rail increases beyond a first voltage level. If this increase is detected, the detecting stage activates the clamping stage, which begins reducing the voltage rail. Once the voltage rail decreases beneath the first voltage level, the detecting stage stops activating the clamping stage. In this way, the clamping circuit protects the computer system from voltage spikes on the voltage rail.

22 Claims, 5 Drawing Sheets

CLAMPING CIRCUIT FOR USE IN COMPUTER SYSTEM

BACKGROUND OF THE INVENTION

1. Field of the Invention

This invention relates to a clamping circuit in a computer system. More particularly, this invention relates to a clamping circuit used in a computer system to prevent damage or erroneous behavior caused by voltage spikes and other over-voltage conditions.

2. Description of the Related Art

The components used in computer systems are designed to be operated within certain ranges. If a component is operated outside of its tolerated range, its reliability may be greatly reduced. In certain circumstances, the component may even be destroyed. Electrical noise in computer systems may cause voltage spikes and other over-voltage conditions. These voltage spikes and over-voltage conditions may cause damage to components in the computer system. Even if these conditions do not damage the components, the over-voltage conditions may still cause data loss or improper operation. For example, noise may cause logic gates or other devices to produce erroneous output signals.

Figure 1:
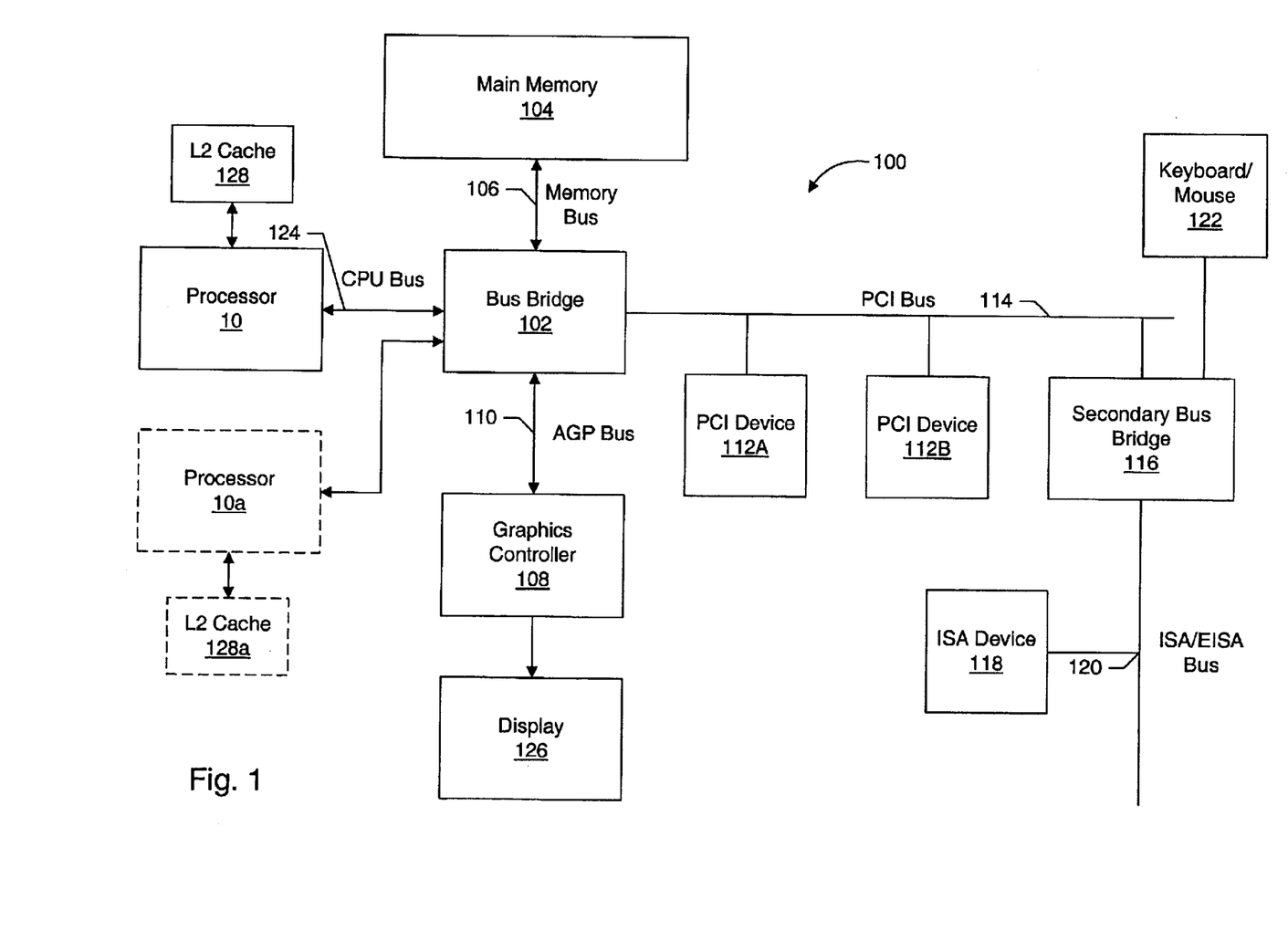
FIG. 1 is a block diagram of a computer system.

Turning now to FIG. 1, a block diagram of one embodiment of a computer system 100 including processor 10 coupled to a variety of system components through a bus bridge 102 is shown. Other embodiments are possible and contemplated. In the depicted system, a main memory 104 is coupled to bus bridge 102 through a memory bus 106, and a graphics controller 108 is coupled to bus bridge 102 through an AGP bus 110. Finally, a plurality of PCI devices 112A–112B are coupled to bus bridge 102 through a PCI bus 114. A secondary bus bridge 116 may further be provided to accommodate an electrical interface to one or more EISA or ISA devices 118 through an EISA/ISA bus 120. Processor 10 is coupled to bus bridge 102 through a CPU bus 124 and to an optional L2 cache 128.

Bus bridge 102 provides an interface between processor 10, main memory 104, graphics controller 108, and devices attached to PCI bus 114. When an operation is received from one of the devices connected to bus bridge 102, bus bridge 102 identifies the target of the operation (e.g. a particular device or, in the case of PCI bus 114, that the target is on PCI bus 114). Bus bridge 102 routes the operation to the targeted device. Bus bridge 102 generally translates an operation from the protocol used by the source device or bus to the protocol used by the target device or bus.

In addition to providing an interface to an ISA/EISA bus for PCI bus 114, secondary bus bridge 116 may further incorporate additional functionality, as desired. An input/output controller (not shown), either external from or integrated with secondary bus bridge 116, may also be included within computer system 100 to provide operational support for a keyboard and mouse 122 and for various serial and parallel ports, as desired An external cache unit (not shown) may further be coupled to CPU bus 124 between processor 10 and bus bridge 102 in other embodiments. Alternatively, the external cache may be coupled to bus bridge 102 and cache control logic for the external cache may be integrated into bus bridge 102. 12 cache 128 is further shown in a backside configuration to processor 10. It is noted that L2 cache 128 may be separate from processor 10, integrated into a cartridge (e.g. slot 1 or slot A) with processor 10, or even integrated onto a semiconductor substrate with processor 10.

Main memory 104 is a memory in which application programs are stored and from which processor 10 primarily executes. A suitable main memory 104 comprises DRAM (Dynamic Random Access Memory). For example, a plurality of banks of SDRAM (Synchronous DRAM) or Rambus DRAM (RDRAM) may be suitable. PCI devices 112A–112B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 118 is illustrative of various types of peripheral devices, such as a modem, a sound card, and a variety of data acquisition cards such as GPIB or field bus interface cards.

Graphics controller 108 is provided to control the rendering of text and images on a display 126. Graphics controller 108 may embody a typical graphics accelerator generally known in the art to render three-dimensional data structures which can be effectively shifted into and from main memory 104. Graphics controller 108 may therefore be a master of AGP bus 110 in that it can request and receive access to a target interface within bus bridge 102 to thereby obtain access to main memory 104. A dedicated graphics bus accommodates rapid retrieval of data from main memory 104. For certain operations, graphics controller 108 may further be configured to generate PCI protocol transactions on AGP bus 110. The AGP interface of bus bridge 102 may thus include functionality to support both AGP protocol transactions as well as PCI protocol target and initiator transactions. Display 126 is any electronic display upon which an image or text can be presented. A suitable display 126 includes a cathode ray tube ("CRT"), a liquid crystal display ("LCD"), etc.

It is noted that, while the AGP, PCI, and ISA or EISA buses have been used as examples in the above description, other bus architectures are also known. It is further noted that computer system 100 may be a multiprocessing computer system including additional processors (e.g. processor 10a shown as an optional component of computer system 100). Processor 10a may be similar to processor 10. More particularly, processor 10a may be an identical copy of processor 10. Processor 10a may be connected to bus bridge 102 via an independent bus (as shown in FIG. 1) or may share CPU bus 124 with processor 10. Furthermore, processor 10a may be coupled to an optional L2 cache 128a similar to L2 cache 128.

Computer system 100 may require many different voltages. For example, in a split rail design, the core circuitry of the microprocessor may require a different voltage than the I/O circuitry of the microprocessor. Other circuitry in the computer system may require additional voltages as well. These voltages may be supplied by devices such as linear regulators or switching regulators. Various components in computer system 100 may also have strict requirements regarding the quality of these input voltages in order to ensure that their proper operation.

Linear regulators provide admirable dynamic-load response in low-voltage, high-current environments like computer system 100. Because they use a simplified design, linear regulators are low cost devices. However, linear regulators are fairly inefficient, consuming a great deal of power and generating an undesirable amount of heat. There is a current trend to lower voltages and increase current in computer systems, making linear regulators' disadvantages even more apparent.

Switching regulators typically work by passing an input voltage through an input switch that is intermittently turned on and off. Because the switch frequently turns off, only a small amount of power is lost during conversion. Consequentially, switching regulators are much more efficient than linear regulators and generate much less heat. The input switching produces a waveform that can be transformed, rectified and smoothed to produce a DC output voltage. By adjusting the duty cycle of the input switch, the regulated output voltage can be controlled to lie within a certain range. Because switching regulators are very efficient, they are popular in computer systems. However, one commonly encountered drawback to using a switching regulator is that it may introduce noise into the input voltage supplied to the switching unit. For example, this noise may be a ripple at the switching frequency, or it may be radiated noise from switching currents in the regulator at the switching frequency and its harmonics.

SUMMARY

Various embodiments of a clamping circuit and method for use in a computer system are disclosed In a first embodiment, a voltage regulator provides a supply voltage to various components in a computer system. One of these components is a switching regulator, which regulates the supply voltage in order to provide a termination voltage to system memory. System memory may include DDR SDRAM. The computer system also includes a clamping circuit that includes a detecting stage and a clamping stage. The detecting stage detects when the supply voltage increases beyond a first voltage level. The first voltage level may be lower than a maximum voltage level. The maximum voltage level may be a voltage level that causes erroneous behavior in some of the components that receive the supply voltage. If this increase is detected, the detecting stage activates the clamping stage. When activated, the clamping stage is configured to reduce the supply voltage. Once the supply voltage rail decreases beneath the first voltage level, the detecting stage may stop activating the clamping stage.

The detecting stage of the clamping circuit may include a voltage divider coupled to the supply voltage. When the supply voltage exceeds the first voltage level, the voltage divider is configured to activate the clamping stage. Upon activation, the clamping stage may reduce the supply voltage by shunting current to ground. The clamping stage might include a shunt regulator that is configured to turn on when the detecting stage detects the supply voltage has exceeded the first voltage level. Furthermore, the clamping stage might also include a transistor that is configured to turn on when the shunt regulator turns on and that is coupled between the supply voltage and ground. When the transistor turns on, it shunts current from the supply voltage to ground.

In another embodiment, a method of operating a computer system is disclosed. The method provides a voltage rail from a linear regulator to a plurality of components including a switching regulator in the computer system. A termination voltage is provided to system memory, which may include DDR SDRAM, by the switching regulator. If the voltage rail is detected to be exceeding of the first voltage level, the voltage rail is clamped so that the voltage rail does not exceed a maximum voltage level. The detecting may be done by using a voltage divider to measure the voltage rail. The clamping may only occur while the voltage rail is detected to be exceeding the first voltage level.

In another embodiment, a clamping circuit configured to clamp a voltage rail in a computer system is disclosed. The clamping circuit consists of a voltage divider coupled between the voltage rail and ground, a shunt regulator, and a transistor. The voltage divider is coupled to the reference terminal of the shunt regulator and is configured to detect when the voltage rail exceeds a first voltage level. When the voltage divider detects that the voltage rail is exceeding the first voltage level, the voltage divider applies a voltage to the reference terminal that exceeds a reference voltage level. The voltage divider is also configured so that the voltage applied to the reference terminal does not exceed the reference voltage level when the voltage divider does not detect the voltage rail exceeding the first voltage level.

The shunt regulator is configured to turn on when the voltage applied to the reference terminal exceeds the reference voltage level. When the shunt regulator is on, it is configured to sink current from its cathode terminal to its anode terminal. The transistor is configured to turn on in response to the shunt regulator turning on. The emitter of the transistor is coupled to the voltage rail and the collector of the transistor is coupled to ground so that when the transistor turns on it shunts current from the voltage rail to ground. The clamping circuit may also include a resistor coupling the cathode terminal of the shunt regulator to the base of the transistor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 2:
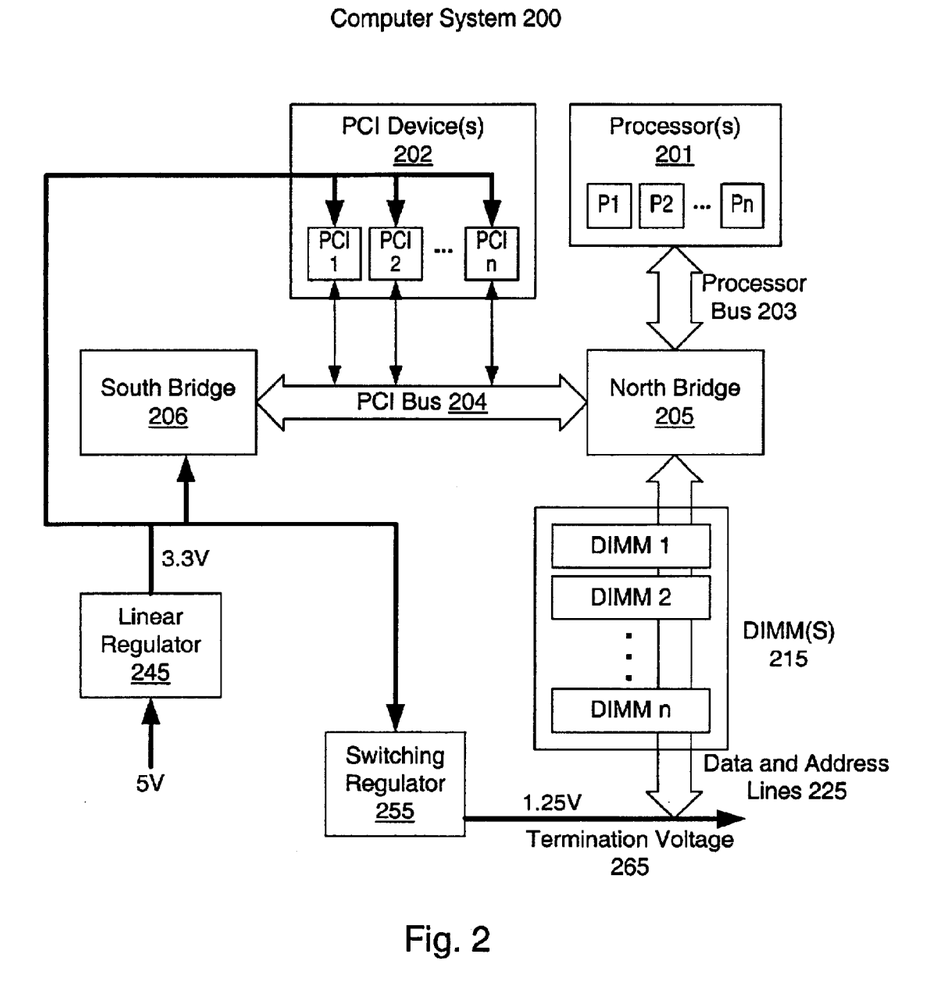
FIG. 2 is a block diagram of a computer system.

FIG. 2 provides one example of a situation in which a computer system needs protection from voltage spikes and over-voltage conditions. As one skilled in the art would appreciate, there are many other circumstances capable of creating voltage spikes or over-voltage conditions in a computer system. FIG. 2 shows a computer system 200. The computer system 200 has one or more processors 201 coupled by a processor bus 203 to a north bridge 205. The north bridge 205, also known as a system controller, may contain such devices as a system bus interface, a memory controller, a Peripheral Component Interconnect (PCI) bus controller, and an Accelerated Graphics Port (AGP). Preferably, the north bridge forwards data, address and control signals between the processor bus, the PCI bus and the memory. The north bridge is coupled to main memory, shown as one or more DIMMs (Dual Inline Memory Modules) 215, by the data and address signals 225. PCI bus 204 couples the north bridge 205 to a south bridge 206. The south bridge 206, also known as a peripheral bus controller, may contain devices such as a PCI to Industry Standard Architecture (ISA) bridge, an Enhanced Integrated Device Electronics (EIDE) controller, and a Universal Serial Bus (USB) controller. The south bridge 206 may perform administrative functions such as interrupt management, clock/calendar/timer functions, configuration management, power supply control, and power-on signal sequencing. The PCI bus 204 is connected to one or more PCI devices 202.

The DIMMs (dual inline memory modules) 215 may include DDR SDRAM (double data rate SDRAM) and may require an additional termination voltage 265. DDR SDRAM specifications may call for termination voltage 265 to be equal to the I/O reference voltage. For example, if the I/O supply voltage is 2.5 V, then input signals have a high logic state of approximately 2.5 V and a low logic stage of approximately 0 V. The I/O reference voltage equals one-half the I/O supply voltage, or 1.25 V. The termination voltage is coupled to the memory module by termination resistors. This actual coupling of the termination voltage to a DIMM is not shown. The termination voltage 265 provides signal integrity to the DIMMs 215. Termination voltage 265 sinks or sources current provided on the data and address input lines 225 as needed to prevent reflection of input signals back onto the input lines 225. For example, if a high logic state is being transmitted on a data line, the termination voltage provides a sink. Alternately, if a low logic state is transmitted, the 1.25 V termination voltage provides a source.

The termination voltage 265 is provided by a switching regulator 255, which uses the 3.3V voltage rail as input voltage to regulate. The linear regulator 245 generates the 3.3V voltage rail and provides this voltage to several other components in computer 100 system 200, such as south bridge 206. As previously described, the switching regulator 255 may introduce noise into the voltage rail. The noise caused by the switching regulator 255 can produce voltage spikes or over-voltage conditions in the voltage rail, endangering sensitive components such as those in the south bridge 206. These components may exhibit erroneous behavior or even be destroyed due to voltage spikes on the voltage rail.

Figure 3:
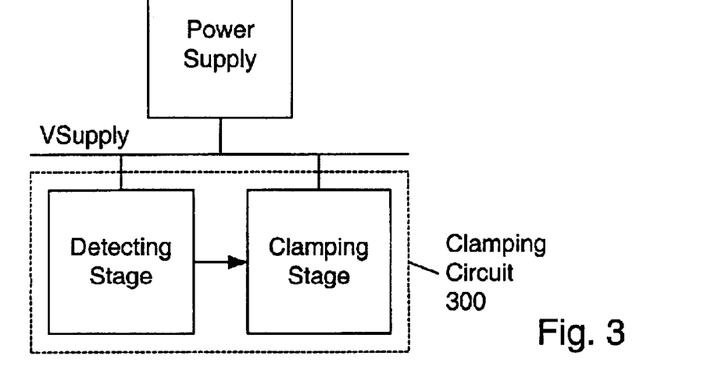
FIG. 3 shows a block diagram of a clamping circuit.

FIG. 3 shows a block diagram of a clamping circuit 300 used to prevent voltage spikes and other over-voltage conditions in a computer system. A detecting stage monitors the voltage and is configured to detect when the voltage exceeds a specified voltage. The detecting stage is also coupled to a clamping stage. Upon detecting a voltage in excess of the specified voltage, the detecting stage is configured to activate the clamping stage. When activated, the clamping stage is configured to reduce the voltage: quickly enough to prevent the voltage from exceeding a maximum voltage. The voltage detecting circuit may be configured to detect a voltage that is lower than the maximum voltage allowable in the voltage being monitored. This configuration gives the clamping circuit time to activate the clamping stage and prevent the voltage from exceeding that maximum. Additionally, the detecting stage may be configured to deactivate the clamping stage once the voltage decreases beneath the specified voltage again.

Figure 4:
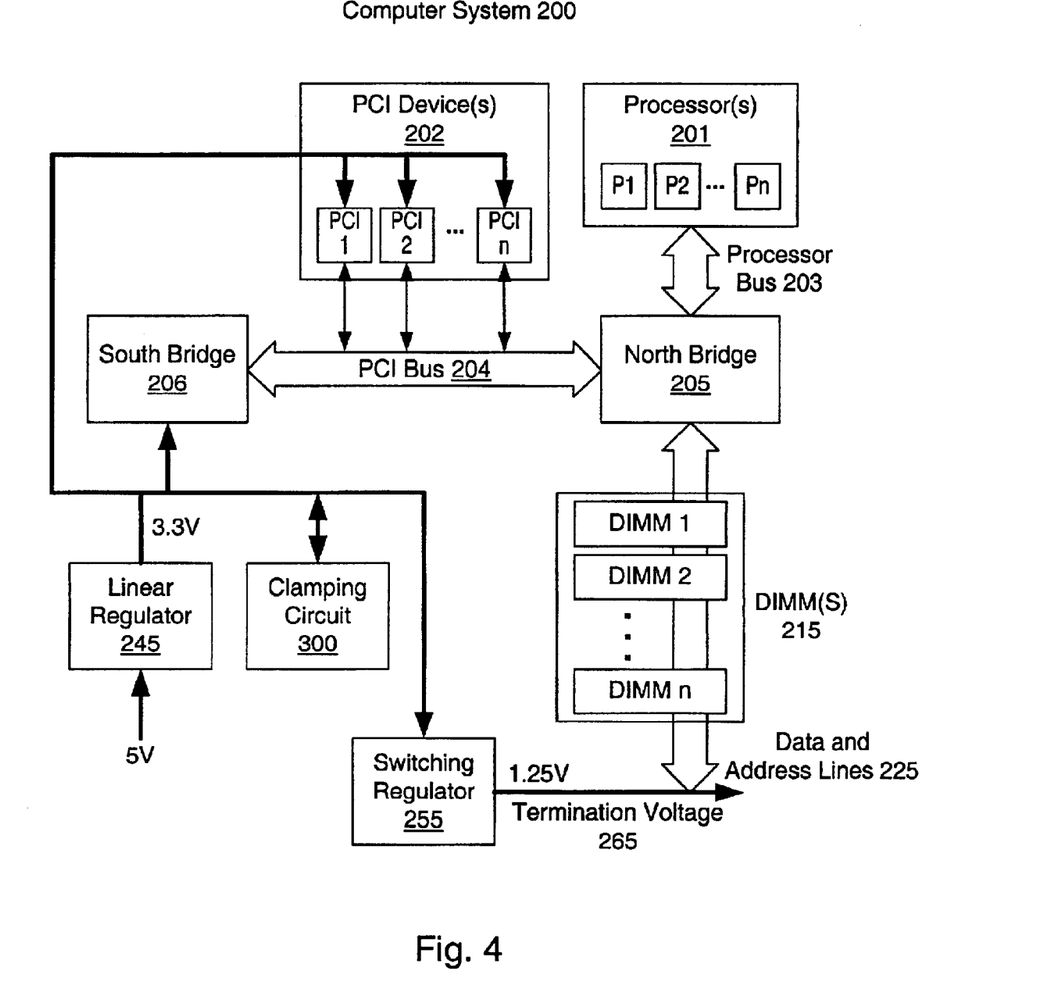
FIG. 4 is a block diagram of a computer system containing the clamping circuit of FIG. 3.

FIG. 4 shows one application of the clamping circuit from FIG. 3. In FIG. 4, a block diagram of computer system 200 from FIG. 2 is shown with the clamping circuit 300 coupled to the 3.3V voltage rail. Sensitive electronic components in the south bridge 206 may not be able to tolerate voltage spikes in this voltage. Any voltage above a maximum voltage may cause erroneous behavior in these components. Such a high voltage might also damage or destroy these components. The switching regulator 255 may be creating voltage spikes in the supply voltage that exceed this maximum voltage. By adding the clamping circuit 300, voltage spikes and over-voltage conditions caused by the switching regulator 255 are prevented from appearing in the supply voltage.

For example, when the switching regulator 255 causes a voltage spike, the voltage on the voltage rail will begin to quickly increase. The clamping circuit 300 may be configured to detect a relatively small increase in the voltage. Thus, at the beginning of the spike, the voltage on the voltage rail may exceed the voltage the detecting stage is configured to detect, causing the detecting stage to activate the clamping stage. When the clamping stage is activated, it begins to reduce the voltage. The clamping circuit 300 may be configured to turn on very quickly, so that the clamping circuit 300 begins reducing the supply voltage contemporaneously with the voltage spike occurring. The clamping circuit 300 may also contain components capable of sinking a significant amount of current to ground. Thus, the clamping circuit 300 can be configured to keep voltage spikes caused by the switching regulator 255 from causing the voltage to exceed the maximum voltage. By doing so, the clamping circuit 300 protects sensitive electrical components dependent on this rail from voltage spikes and other over-voltage conditions. Once the voltage spike has been clamped and the supply voltage returns to its normal level, the clamping circuit may be configured to deactivate the clamping stage.

Figure 5:
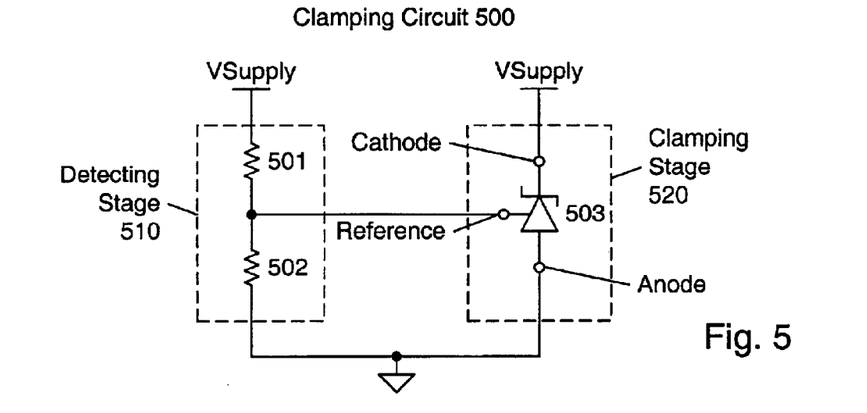
FIG. 5 shows one embodiment of the clamping circuit from FIG. 3.

FIG. 5 shows one particular embodiment of the clamping circuit illustrated in FIG. 3. Here, the voltage rail VSupply is coupled to a detecting stage 510. In one embodiment, the detecting stage 510 may be or may include a voltage divider, which may be coupled to the reference voltage input of a shunt regulator 503. If VSupply increases to a certain level, the voltage across the resistor 502 becomes equal to the voltage required to turn on the shunt regulator 503. In this way, the detecting stage monitors VSupply and activates the clamping stage when VSupply exceeds a certain voltage. The voltage divider may use precision resistors such as 1% resistors so that the voltage detecting stage can more accurately turn on the clamping stage. The values of the resistors 501 and 502 may be chosen so that the voltage divider detects a lower voltage than the maximum voltage allowable in the VSupply. When VSupply does not exceed the specified voltage set to turn on the shunt regulator, such as before or after a voltage spike in VSupply, the detecting stage is not activated.

In one embodiment, the clamping stage 520 may be or may include a shunt regulator 503 having cathode, anode and reference terminals. When the voltage applied to the reference terminal exceeds a reference voltage, the shunt regulator behaves, like a diode and allows current to flow from the anode terminal to the cathode terminal. Thus, when the voltage across the resistor 502 becomes high enough to turn on the shunt regulator 503, the shunt regulator 503 begins sinking current from VSupply to ground. Preferably, the shunt regulator 503 turns on quickly enough to prevent VSupply from exceeding the maximum voltage. However, this embodiment of a clamping circuit may be limited by the amount of current the shunt regulator 503 is capable of sinking. For example, if the shunt regulator 503 is a SC431 from Semtech Corporation, the maximum current it can sink might be 150 mA. Thus, in some embodiments, the shunt regulator 503 may not sink enough current to prevent VSupply from exceeding the maximum voltage.

Figure 6:
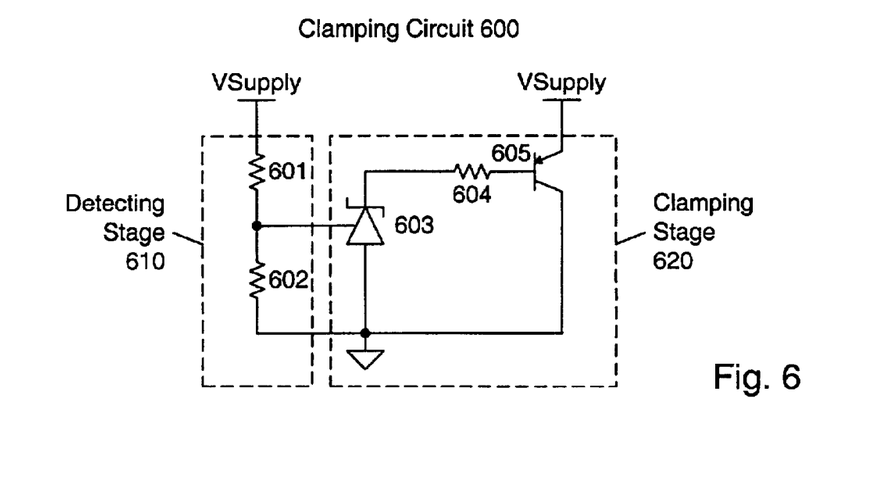
FIG. 6 shows another embodiment of the clamping circuit from FIG. 3.

FIG. 6 shows a second embodiment of the clamping circuit from FIG. 3. In this embodiment, the detecting stage again may contain a voltage divider. The clamping stage 620 may contain a shunt regulator 603, resistor 604 and bipolar junction transistor (BJT) 605. When VSupply becomes high enough that the voltage across the resistor 602 is equal to the voltage required to turn on the shunt regulator 603, the detecting stage 610 activates the clamping stage 620, which begins reducing VSupply. When the shunt regulator 603 turns on, it begins sinking current from the base of the BJT 605 across the resistor 604. This base current turns on BJT 605, which begins sinking current from VSupply to ground. A BJT 605 may be chosen so that the amount of current that can be shunted to ground may be much greater than the amount of current the shunt regulator 603 is capable of sinking.

Preferably, the resistor 604 is chosen so that the current applied to the base is large enough to cause BJT 605 to sink enough current to ground to prevent VSupply from exceeding its maximum allowable voltage. At the same time, the resistor 604 should be large enough to prevent the base current from being so large that the BJT 605 burns out. In a normal BJT, the collector current is the gain, e.g. approximately 100, times the base current ($I_B = \beta I_C$, where $\beta$ is approx. 100, e.g.). Every transistor specifies a maximum collector current value, and if this value is exceeded, the transistor may be damaged or destroyed. Therefore, the size of resistor 604 may be chosen to prevent the destruction of the BJT 605.

Still looking at FIG. 6, a more detailed embodiment of a clamping circuit for use in the computer system of FIG. 4 is described. Here, VSupply is the supply voltage provided by the linear regulator 245 in FIG. 4. This supply voltage normally equals 3.3 V. The voltage divider is composed of two 1% precision resistors with values of 402 Ω (501) and 1K Ω (502). The voltage at the input to the shunt regulator 603 is equal to VSupply*R1/(R1+R2). The shunt regulator 603 is an SC431 with a turn-on voltage of 2.5 V. Therefore, if voltage spikes produced by the switching regulator 255 cause VSupply to rise to 3.5 V, the voltage at the input of the SC431 will become 3.5*1000/1402=2.5 V, causing the SC431 will turn on. When the SC431 turns on, it begins sinking current through the resistor 504 (390 Ω) into the base of the transistor 605. The value of resistor 604 is chosen so that the BJT 605 is provided with enough base current to adequately shunt current from VSupply, but not so much base current that BJT 605 burns out. When base current is provided to the transistor 605, it turns on. The transistor 605 might be a MMBT4403, for example. The MMBT4403 has a maximum collector current of 800 mA, so it may provide a more robust clamp capable of sinking much more current than the SC431 alone.

Figure 7:
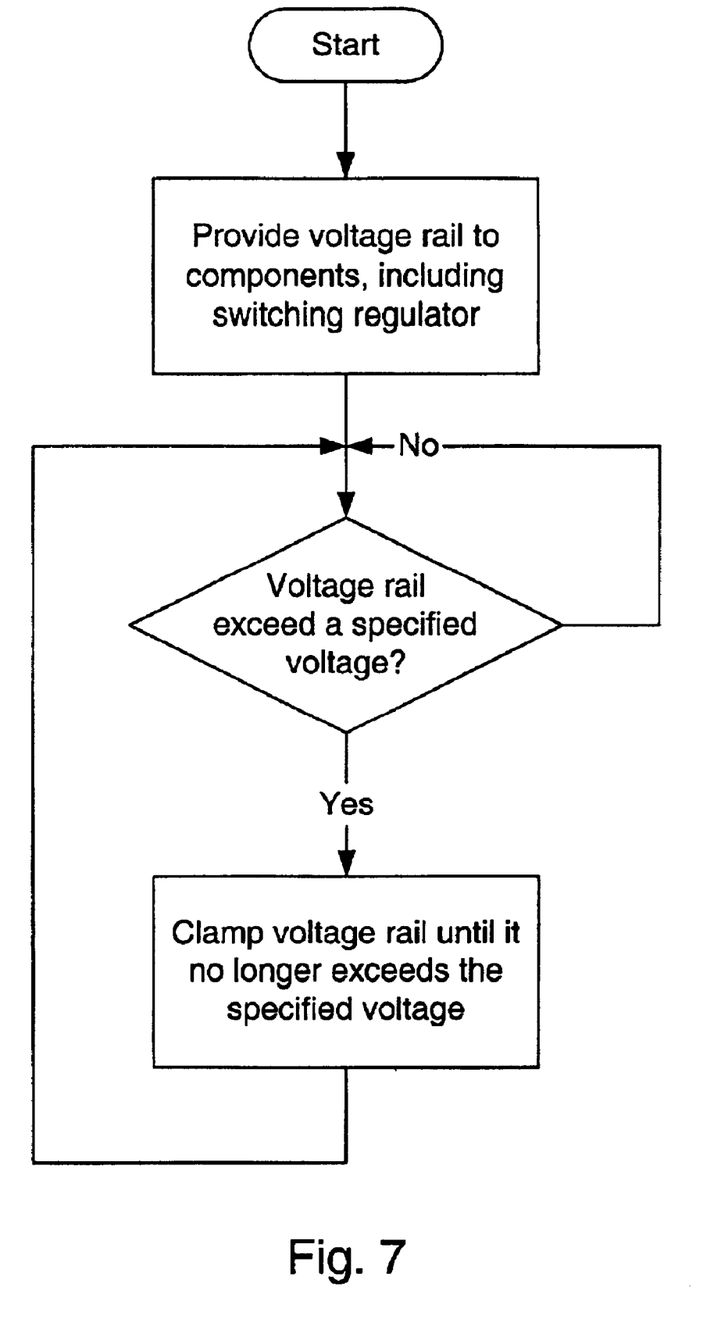
FIG. 7 is a flowchart illustrating a method of clamping a voltage rail in a computer system.

Looking now at FIG. 7, a method for operating a computer system is described. Here, a voltage rail is provided to several components of the computer system. One of these components may be a switching regulator. The switching regulator might be regulating the voltage rail in order to provide another voltage in the computer system. For example, the switching regulator may be supplying a termination voltage to system memory. The voltage rail may be monitored for voltage increases. For example, a voltage divider might be configured to measure the voltage rail, allowing the voltage divider to indicate when the voltage rail increases beyond a specified voltage.

If the voltage rail increases to a point exceeding the specified voltage, the voltage rail may be clamped until it no longer exceeds the specified voltage. In one embodiment, a voltage divider might be configured to output a voltage sufficient to activate a clamping device when the voltage rail increases beyond the specified voltage. The clamping device might be a shunt regulator configured to activate a transistor. When activated, the transistor might be configured to sink current from the voltage rail to ground. If the voltage rail decreases beneath the specified level, the voltage divider may be configured to stop activating the clamping device. The specified voltage may be chosen to ensure that the voltage rail does not exceed a maximum voltage that harms or causes improper operation of components supplied by the voltage rail.

Numerous variations and modifications will become apparent to those skilled in the art once the above disclosure is fully appreciated. It is intended that the following claims be interpreted to embrace all such variations and modifications.

It is claimed:

1. A computer system, comprising:
   system memory;
   a voltage regulator configured to provide a supply voltage to a plurality of components in the computer system, wherein one of the components is a switching regulator;
   the switching regulator, wherein the switching regulator is configured to regulate the supply voltage and to provide a termination voltage, separate from the supply voltage, to the system memory; and
   a clamping circuit, wherein the clamping circuit comprises a detecting stage and a clamping stage, wherein the detecting stage is configured to activate the clamping stage when the supply voltage exceeds a first voltage level, and wherein the clamping stage is coupled to the detecting stage and configured to reduce the supply voltage in response to being activated by the detecting stage.

2. The computer system of claim 1, wherein the system memory comprises DDR SDRAM.

3. The computer system of claim 1, wherein the detecting stage comprises a voltage divider coupled to the supply voltage and configured to monitor the supply voltage, wherein the voltage divider provides a voltage activating the clamping stage when the supply voltage exceeds the first voltage level.

4. The computer system of claim 1, wherein the clamping stage is configured to reduce the supply voltage by shunting current to ground.

5. The computer system of claim 4, wherein the clamping stage comprises a shunt regulator.

6. The computer system of claim 5, wherein the clamping stage further comprises a transistor, wherein the shunt regulator is configured to provide a base current to the transistor, and wherein the transistor is configured to reduce the supply voltage by shunting current to ground when provided with the base current.

7. The computer system of claim 1, wherein the first voltage level is lower than a maximum voltage level.

8. The computer system of claim 7, wherein the clamping stage is further configured to prevent the supply voltage from exceeding the maximum voltage level.

9. The computer system of claim 7, wherein the maximum voltage level is a voltage level that causes erroneous behavior in a first portion of the components provided with the supply voltage.

10. The computer system of claim 1, wherein the detecting stage is further configured to not activate the clamping stage when the supply voltage does not exceed the first voltage level.

11. The computer system of claim 1, wherein the clamping stage is further configured to stop reducing the supply voltage when the detecting stage stops detecting that the supply voltage exceeds the first voltage level.

12. A method of operating a computer system, comprising:
   providing a voltage rail to a plurality of components in the computer system, wherein the voltage rail is provided by a linear regulator, and wherein the plurality of components comprise a switching regulator;
   providing a termination voltage, separate from the supply voltage, to system memory, wherein the termination voltage is provided by the switching regulator;
   detecting when the voltage rail exceeds a first voltage level; and
   clamping the voltage rail in response to said detecting so that the voltage rail does not exceed a maximum voltage level, wherein the maximum voltage level is a voltage level that causes erroneous behavior in a first portion of the components provided with the voltage rail.

13. The method of claim 12, wherein the system memory comprises DDR SDRAM.

14. The method of claim 12, wherein said clamping only occurs while the voltage rail is detected to be exceeding the first voltage level.

15. The method of claim 12, wherein said detecting comprises using a voltage divider to measure the voltage rail.

16. The method of claim 12, wherein said clamping comprises shunting current from the voltage rail to ground.

17. The method of claim 12, wherein said clamping comprises activating a shunt regulator, wherein the shunt regulator is configured to shunt current to ground when activated.

18. The method of claim 12, wherein said clamping comprises using a shunt regulator to activate a transistor coupled to the voltage rail, wherein the transistor is configured to shunt current from the voltage rail to ground when activated.

19. The method of claim 12, wherein said clamping is done quickly enough that the voltage rail does not exceed the maximum voltage level.

20. The method of claim 19, wherein the first voltage level is lower than the maximum voltage level.

21. A clamping circuit configured to clamp a voltage rail in a computer system, comprising:
   a voltage divider coupled to the voltage rail and to a shunt regulator, wherein the voltage divider is configured to apply an input voltage to the shunt regulator, wherein the voltage divider is configured so that the input voltage is greater than or equal to a reference voltage level of the shunt regulator when a voltage on the voltage rail is greater than or equal to a first voltage level, and wherein the voltage divider is configured so that the input voltage is less than the reference voltage level when the voltage on the voltage rail is less than the first voltage level;
   the shunt regulator coupled to the voltage divider, wherein the shunt regulator is configured to turn on when the input voltage is greater than or equal to the reference voltage level and turn off when the input voltage is less than the reference voltage level; and
   a transistor coupled to the voltage rail and to the shunt regulator, wherein the transistor is configured to turn on in response to the shunt regulator turning on, wherein the transistor is configured to sink current from the voltage rail when the transistor is on to decrease the voltage on the voltage rail below first voltage level while the voltage rail is being supplied by a power supply, and wherein the transistor is further configured to turn off when the shunt regulator is off.

22. The clamping circuit of claim 21, further comprising a current-limiting resistor coupled between the shunt regulator and the transistor.

* * * * *